(12) United States Patent
Dubourg et al.

(10) Patent No.: US 9,328,604 B2
(45) Date of Patent: May 3, 2016

(54) METHODS AND SYSTEMS FOR DETERMINING STANDOFF BETWEEN A DOWNHOLE TOOL AND A GEOLOGICAL FORMATION

(71) Applicant: Schlumberger Technology Corporation, Sugar Land, TX (US)

(72) Inventors: Isabelle M Dubourg, Chilly-Mazarin (FR); Roel Van Os, Bourg-la-Reine (FR); Luca Ortenzi, Mogliano (IT)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 586 days.

(21) Appl. No.: 13/663,443

(22) Filed: Oct. 29, 2012

(65) Prior Publication Data

US 2013/0106421 A1    May 2, 2013

(30) Foreign Application Priority Data

Oct. 28, 2011   (EP) .................................... 11290508

(51) Int. Cl.
*E21B 47/08* (2012.01)
*G01V 3/12* (2006.01)

(52) U.S. Cl.
CPC ................ *E21B 47/082* (2013.01); *G01V 3/12* (2013.01)

(58) Field of Classification Search
CPC ... E21B 47/122; E21B 17/1014; E21B 47/08; G01V 3/20; G01V 3/24; G01R 35/00
USPC .......................... 324/323–375; 340/853–856; 250/253–266; 702/9; 73/152.02
See application file for complete search history.

(56) References Cited

U.S. PATENT DOCUMENTS 4,916,400 A * 4/1990 Best et al. ..................... 324/338
5,200,705 A   4/1993 Clark et al.
(Continued)

FOREIGN PATENT DOCUMENTS

EP   556114 A1 * 8/1993
EP   0556114     1/1998
(Continued)

OTHER PUBLICATIONS

M. Allouche et al, High-resolution Images and Formation Evaluation in Slim Holes from a New Logging-While-Drilling Azimuthal Laterolog Device, Jun. 14, 2010, Society of Petroleum Engineers, SPE EUROPAC/EAGE Annual Conference and Exhibition, All Pages.*

(Continued)

*Primary Examiner* — Benjamin M Baldridge
*Assistant Examiner* — Rahul Maini

(57) ABSTRACT

Methods and systems for determining a standoff between a downhole tool and a geological formation are provided. The standoff may be determined using a standoff measurement system that includes an electrode component, one or more electronics components, one or more transformers, and one or more processor units. When the standoff is expected to be no more than a first distance, a first measurement can be made where both originating and resulting electrical signals are induced at the electrode component. When the standoff is expected to be no less than a second distance, a second measurement can be made where an originating electrical signal is induced at one of the transformers while a resulting electrical signal is induced at the electrode component.

19 Claims, 13 Drawing Sheets

(56) References Cited

U.S. PATENT DOCUMENTS

| | | |
|---|---|---|
| 5,235,285 A | 8/1993 | Clark et al. |
| 5,339,036 A | 8/1994 | Clark et al. |
| 5,339,037 A | 8/1994 | Bonner et al. |
| 5,359,324 A | 10/1994 | Clark et al. |
| 5,519,668 A | 5/1996 | Montaron |
| 5,754,050 A * | 5/1998 | Smits et al. ............ 324/366 |
| 6,373,254 B1 | 4/2002 | Dion et al. |
| 6,384,605 B1 | 5/2002 | Li |
| 6,671,623 B1 | 12/2003 | Li |
| 7,095,233 B1 | 8/2006 | Tabanou et al. |
| 7,242,194 B2 | 7/2007 | Hayman et al. |
| 7,525,315 B2 | 4/2009 | Fredette et al. |
| 7,873,475 B2 | 1/2011 | Os et al. |
| 8,754,651 B2 * | 6/2014 | Habashy et al. ............ 324/339 |
| 2010/0097068 A1 * | 4/2010 | Itskovich et al. ............ 324/367 |
| 2010/0312477 A1 * | 12/2010 | Sanstrom et al. ............ 702/6 |

FOREIGN PATENT DOCUMENTS

| | | |
|---|---|---|
| EP | 1970733 | 7/2010 |
| EP | 2594735 B1 | 7/2014 |

OTHER PUBLICATIONS

Allouche M. et al: "High-resolution Images and Formation Evaluation in Slim Holes from a New Logging-While-Drilling Azimuthal Laterolog Device", SPE, vol. SPE131513, Jun. 14, 2010, pp. 1-10.

Manfred G Prammer et al: "Field Testing of an Advanced Lwd Imaging/ Resistivity Tool", SPWLA 48th Annual Logging Symposium,, Jun. 3, 2007, pp. 1-15.

EP publication No. 2594735A1 with search report for the equivalent EP application No. 11290508.8 issued on May 22, 2013.

Office Action No. 88794 issued in related MX application No. MX/a/2012/012583 on Oct. 26, 2015, 5 pages.

* cited by examiner

METHODS AND SYSTEMS FOR DETERMINING STANDOFF BETWEEN A DOWNHOLE TOOL AND A GEOLOGICAL FORMATION

BACKGROUND

Downhole tools used for geophysical exploration often include sensors for collecting information about ambient subsurface materials. Sensors may include ones such as those used for resistivity measurements and imaging. The shape and size of a borehole within a geological formation may be valuable information that can provide detail on the integrity of the borehole and the presence of geomechanical problems such as hole damage and wash-outs. The information can also be used to serve as a basis for decision making in the later stages, e.g. for the casing and cementing of a borehole within the geological formation. Moreover, measurements (e.g., resistivity measurements) made by the downhole tool may be sensitive to the shape and size of the borehole, and accurate knowledge of borehole shape/size can serve as a basis for obtaining more accurate measurements. Mechanical and/or acoustic calipers and other devices can be used to measure the distance between the downhole tool and the geological formation. But such devices may not be suitable for use while drilling. Thus, it is desirable that the standoff between the surface of the downhole tool to the wall of a borehole penetrating the geological formation be known so that more accurate measurements regarding the geological formation can be taken, particularly while drilling.

SUMMARY

This disclosure is directed to methods and systems for determining a standoff between a downhole tool and a geological formation.

In particular, embodiments are provided herein for determining the standoff between a surface of the downhole tool and a surface of the geological formation. In some cases, the embodiments provided herein are for determining a standoff, for example, of a downhole tool disposed in a borehole penetrating the geological formation. The standoff can then be a distance between a surface of the downhole tool and a wall of the borehole when, for example, a channel between the downhole tool and the borehole wall is filled with drilling fluid, such as for example a conductive drilling fluid (e.g., water-based mud).

In the embodiments described herein, the standoff can be determined using a standoff measurement system having a downhole tool (e.g., a drilling tool such as a logging-while-measurement tool, a measurement-while-drilling tool, a combination thereof, etc.) disposed in a borehole penetrating the geological formation. In some embodiments, components of the standoff measurement system (e.g., an electrode component and a transformer) can be exposed from a circumferential surface of the downhole tool. In those cases where a drilling tool is used, as the drilling tool rotates inside the borehole, the electrode component of the standoff measurement system occupies different angular positions and/or varying distances/standoffs from the borehole wall. A measurement sequence can be repeated at a certain number of positions where the standoff(s) may be determined, for example, by matching signal data retrieved from the standoff measurement system against a predetermined modeled tool response.

In particular, the embodiments provided herein describe two measurement approaches that can be used for obtaining the standoff between a surface of the downhole tool and a surface of the borehole. The first approach can be performed, for example, when the standoff between the borehole wall and the downhole tool is no more than a first distance. In some embodiments, the first distance is, for example, at most six times the spacing distance between two electrodes of the electrode component of the standoff measurement system that are to be used for measuring the standoff.

The second approach can be performed, for example, when the standoff between the borehole wall and the surface of the downhole tool is at least a second distance or greater. In some embodiments, the second distance is, for example, at least two times the spacing distance between two electrodes of the electrode component of the standoff measurement system that are to be used for measuring the standoff and, for example, up to about one order of magnitude larger than the spacing distance between the two electrodes of the electrode component.

In some embodiments, both the first approach and the second approach can be used when the standoff between the borehole wall and the downhole tool is between about the first distance and about the second distance. When two measurements are respectively taken using both of the first and second approaches, the methods and systems described herein can determine which measurement to use based on which approach is determined to be more accurate based on, for example, a predetermined modeled tool response. That is, based on the modeled tool response, the standoff measurement system can determine the amount of uncertainty in determining the standoff using the first approach and the amount of uncertainty in determining the standoff using the second approach. Thus, the standoff measurement system can select between the standoff determined using the first approach and the standoff using the second approach based on which approach has a lesser amount of uncertainty in the calculation.

The embodiments provided herein can use a magnetometer to determine the position of the electrode component exposed from the surface of the downhole tool with respect to an orientation of the downhole tool inside the borehole. Based on the position of the electrode component, the standoff measurement system can determine whether to use the first approach or the second approach for determining the standoff. It will be appreciated that the embodiments provided herein can use other suitable devices/methods to determine the position of the electrode component.

In some embodiments, the electrode component can include a plurality of electrodes provided circumferentially around the surface of the downhole tool. In these embodiments, measurements may be indicative of the average diameter of the borehole. In other embodiments, the electrode component can include two or more electrodes located proximate to each other and exposed from the surface of the downhole tool.

In some embodiments, the distance between two electrodes of the electrode component of the standoff measurement system that are to be used for measuring the standoff can be determined based on the distance from the center of one of the two electrodes to the center of the other of the two electrodes.

Depending on the arrangement of electrodes on the downhole tool, the measurement(s) can be sensitive to the resistivity of the drilling fluid (e.g. water based mud, etc.), the resistivity of the formation, the standoff between the downhole tool and the borehole wall, and/or the contact impedance of the electrodes used for the measurement(s). That is, a substantial change in the drilling fluid resistivity, the formation resistivity, the standoff, and/or the electrode contact impedance can result in a corresponding substantial change of the measurement.

For example, when a measurement is taken using the first approach, the measurement can be sensitive to the resistivity of the drilling fluid, or to the combination of the resistivity of the drilling fluid, the resistivity of the formation and the standoff. The sensitivity can depend on the position of the electrode component of the standoff measurement system. That is, depending on the position of the electrode component, a substantial change in the drilling fluid resistivity, or a substantial change in the combination of the drilling fluid resistivity, the formation resistivity and the standoff can result in a corresponding substantial change of the measurement.

Also, for example, when a measurement is taken using the second approach, the measurement can be sensitive to the resistivity of the drilling fluid, the resistivity of the formation, and to standoff. That is, a substantial change in the drilling fluid resistivity, the formation resistivity and the standoff can result in a corresponding substantial change of the measurement.

The accuracy of a standoff measurement can be based on the amount of error from the actual standoff. For each approach, as discussed in more detail below, when the resistivity of the drilling fluid and the resistivity of the formation are known or estimated, an accurate standoff can be determined. In some embodiments, the standoff can be determined with an accuracy of less than about twenty percent error from the actual standoff. In other embodiments, the standoff can be determined with an accuracy of less than about ten percent error from the actual standoff. In yet some other embodiments, the standoff can be determined with an accuracy of less than about five percent error from the actual standoff.

The drilling fluid resistivity can be measured using the embodiments discussed below. However, in some cases, the drilling fluid resistivity can also be obtained, for example, from drilling fluid samples, or in a separate measurement using another measurement system associated with the downhole tool.

The formation resistivity can be obtained using the embodiments described below. However, in some cases, the formation resistivity can also be obtained, for example, in a separate measurement using another measurement system associated with the downhole tool.

The contact impedance of the electrodes can be measured externally to the downhole environment and can serve as an input to the determination of the standoff. In some embodiments, modeled tool responses are obtained using an expected range of contact impedances, and any measurements obtained by the embodiments disclosed herein are compared to the modeled tool responses corresponding to a selected contact impedance.

In one aspect, a method for determining a standoff between a surface of a downhole tool and a surface of a geological formation is provided. The method includes providing the downhole tool that includes an electrode component exposed from the surface of the downhole tool, at least one transformer exposed from the surface of the downhole tool, and at least one electronics component.

When the distance between the surface of the geological formation and the surface of the downhole tool is expected to be no more than about a first distance, the method can: (i) impose, using at least one of the electronics components, a first originating electrical signal at the electrode component; (ii) measure, using at least one of the electronics components, a first resulting electrical signal at the electrode component to obtain a first measurement, with the first resulting electrical signal generated as a result of the first originating signal; and (iii) fit, using at least one processor unit, the first measurement to a first modeled tool response to determine a first standoff from the surface of the downhole tool to the surface of the geological formation. Also, when the distance between the surface of the geological formation and the surface of the downhole tool is expected to be no less than about a second distance, the method can: (i) impose, using at least one of the electronics components, a second originating electrical signal at the at least one transformer; (ii) measure, using at least one of the electronics components, a second resulting electrical signal at the electrode component to obtain a second measurement, the second resulting electrical signal generated as a result of the second originating electrical signal; and (iii) fit, using at least one processor unit, the second measurement to a second modeled tool response to determine a second standoff from the surface of the downhole tool to the surface of the geological formation.

In another aspect, a system for determining a standoff between a surface of a downhole tool and a surface of a geological formation is provided. The downhole tool includes an electrode component exposed from the surface of the downhole tool, at least one transformer exposed from the surface of the downhole tool, and at least one electronics component.

When the distance between the surface of the geological formation and the surface of the downhole tool is expected to be no more than about a first distance, at least one of the electronics components can: (i) impose a first originating electrical signal at the electrode component; and (ii) measure a first resulting electrical signal at the electrode component to obtain a first measurement, the first resulting electrical signal generated as a result of the first originating electrical signal. When the distance between the surface of the geological formation and the surface of the downhole tool is expected to be no less than about a second distance, at least one of the electronics components can: (i) impose a second originating electrical signal at the at least one transformer; and (ii) measure a second resulting electrical signal at the electrode component to obtain a second measurement, the second resulting electrical signal generated as a result of the second originating electrical signal.

The system also includes at least one processor unit that can: (i) fit the first measurement to a first modeled tool response to determine a first standoff between the surface of the downhole tool and the surface of the geological formation; and/or (ii) fit the second measurement to a second modeled tool response to determine a second standoff between the surface of the downhole tool and the surface of the geological formation.

In yet another aspect, a method for determining a standoff between a surface of a downhole tool to a wall of a borehole is provided. The method includes disposing the downhole tool into the borehole. The downhole tool includes an electrode component exposed from the surface of the downhole tool, and at least one electronics component disposed within the downhole tool. The method also includes imposing, using at least one of the electronics components, a first originating electrical signal at the electrode component when the distance between the borehole wall and the surface of the downhole tool is expected to be no more than about a first distance. Also, the method includes measuring, using at least one of the electronics components, a first resulting electrical signal at the electrode component to obtain a first measurement, the first resulting electrical signal generated as a result of the first originating electrical signal. Further, the method includes fitting, using at least one processor unit, the first measurement to a first modeled tool response to determine the standoff.

In still another aspect, a method for determining a standoff between a surface of a downhole tool to a wall of a borehole is provided. The method includes disposing the downhole tool into the borehole. The downhole tool includes an electrode component exposed from the surface of the downhole tool, at least one transformer exposed from the surface of the downhole tool, and at least one electronics component. The method also includes imposing, using at least one of the electronics components, a second originating electrical signal at the at least one transformer when the distance between the borehole wall and the surface of the downhole tool is expected to be no less than about a second distance. Also, the method includes measuring, using at least one of the electronics components, a second resulting electrical signal at the electrode component to obtain a second measurement, the second resulting electrical signal generated as a result of the second originating electrical signal. Also, the method includes fitting, using at least one processor unit, the second measurement to a second modeled tool response to determine the standoff.

This summary is provided to introduce a selection of concepts that are further described below in the detailed description. This summary is not intended to identify key or essential features of the claimed subject matter, nor is it intended to be used as an aid in limiting the scope of the claimed subject matter.

DRAWINGS

Figure 3:
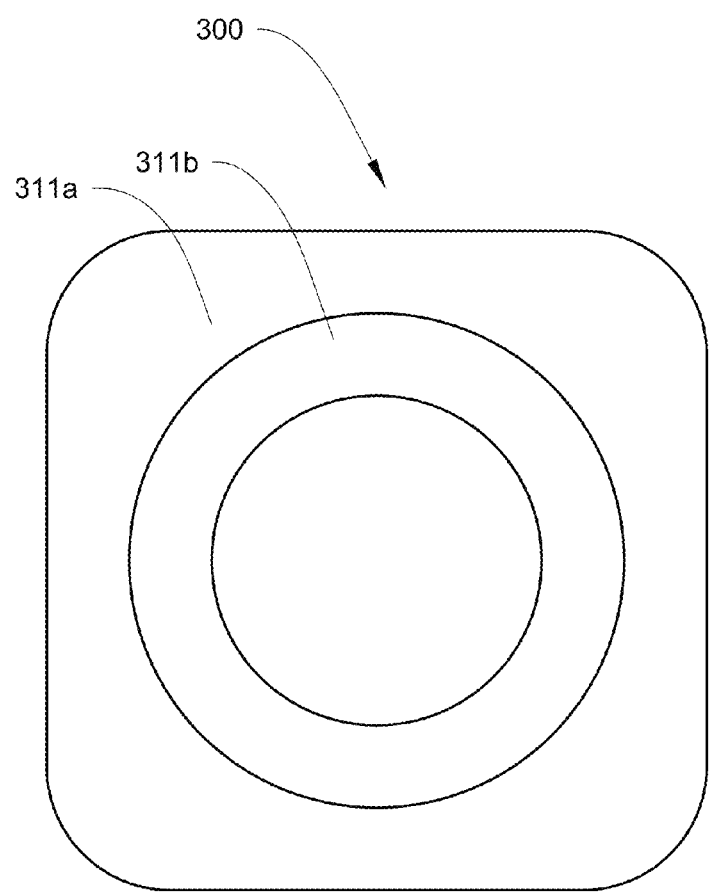

FIG. 3 provides a top view of an electrode button that includes two electrodes, according to one embodiment.

Figure 4:
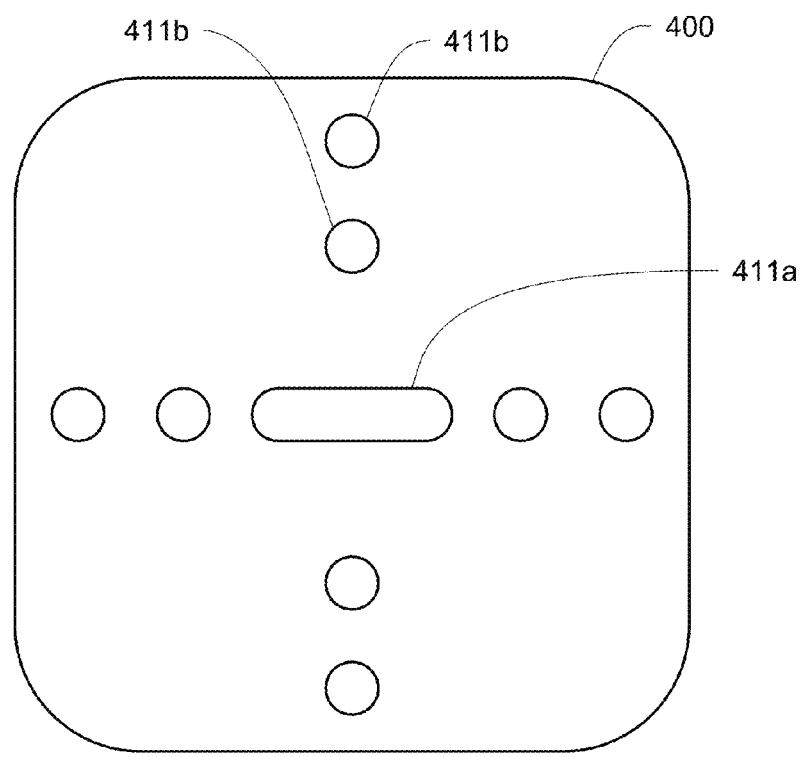

FIG. 4 provides a top view of an electrode component that includes a source electrode and eight measurement electrodes that are spatially arranged to perform a current and/or voltage measurement, according to one embodiment.

Figure 5:
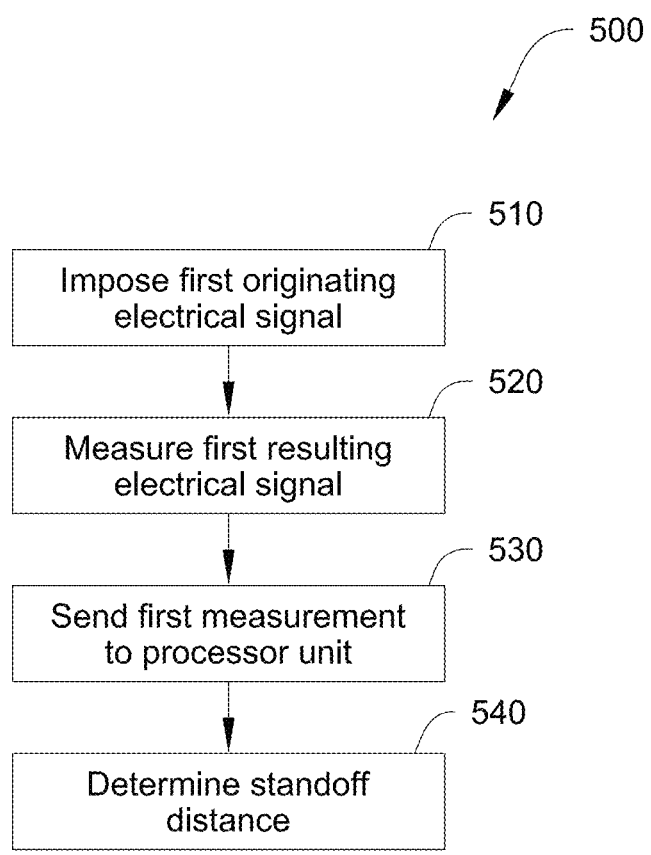

FIG. 5 illustrates one embodiment of a flow chart for estimating a standoff between a surface of a downhole tool and a surface of a geological formation according to a first approach.

Figure 6:
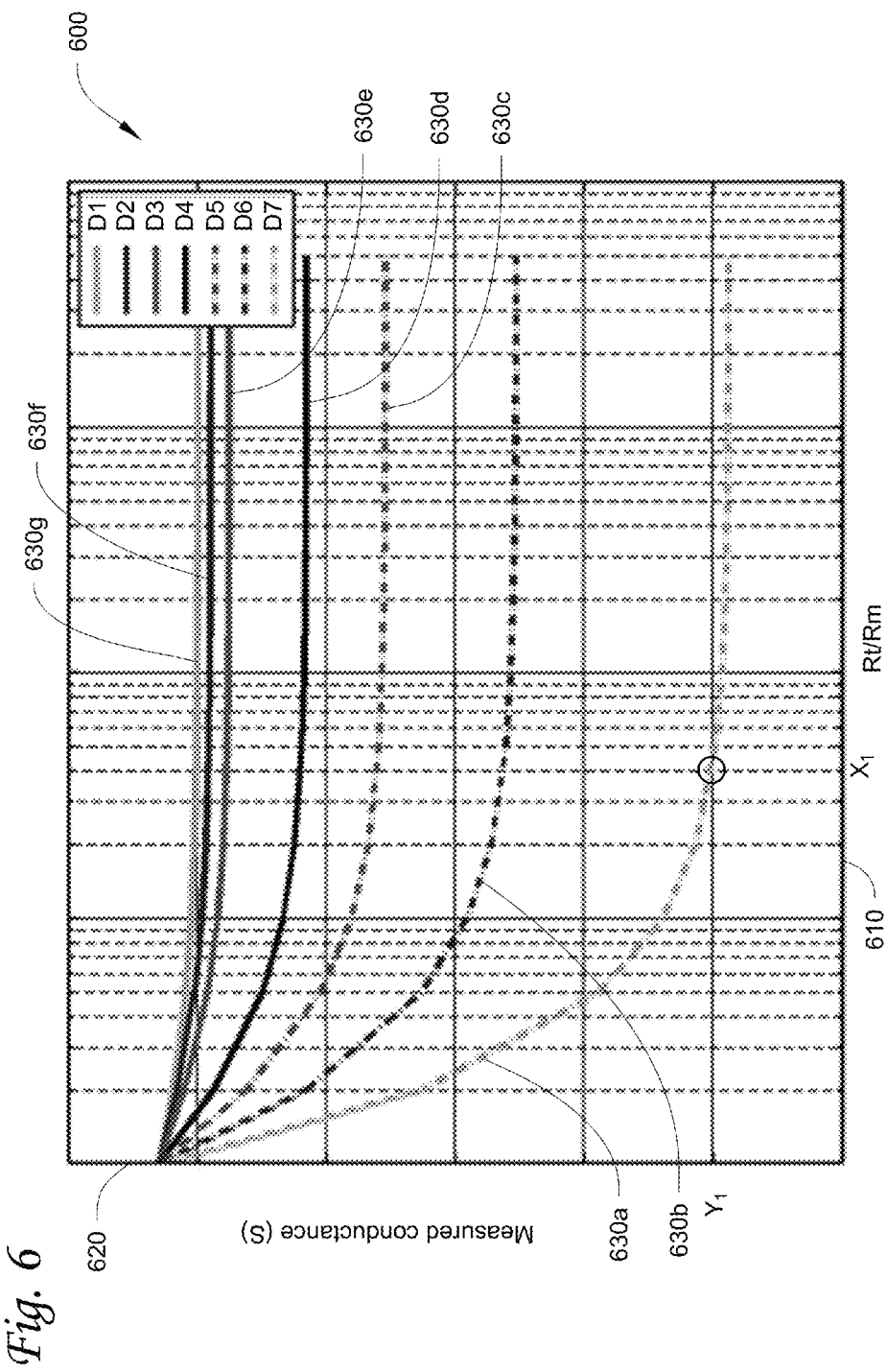

FIG. 6 illustrates an example of a graph of a predetermined modeled tool response of an electrode arrangement using a first approach, according to one embodiment.

Figure 7:
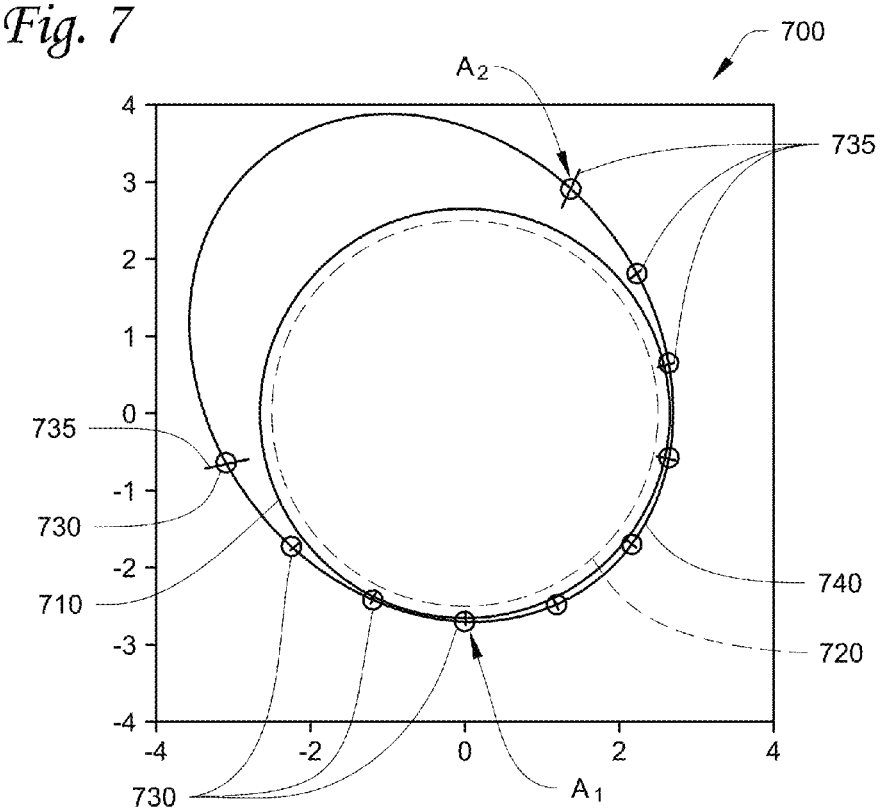

FIG. 7 illustrates a standoff computation chart, according to one embodiment.

Figure 8:
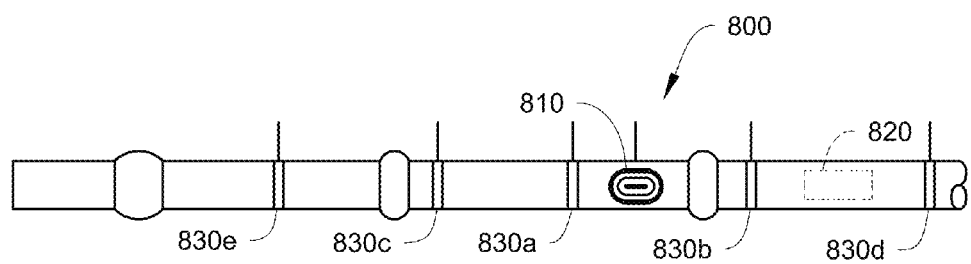

FIG. 8 illustrates a side view of a portion of a downhole tool, according to one embodiment.

Figure 9:
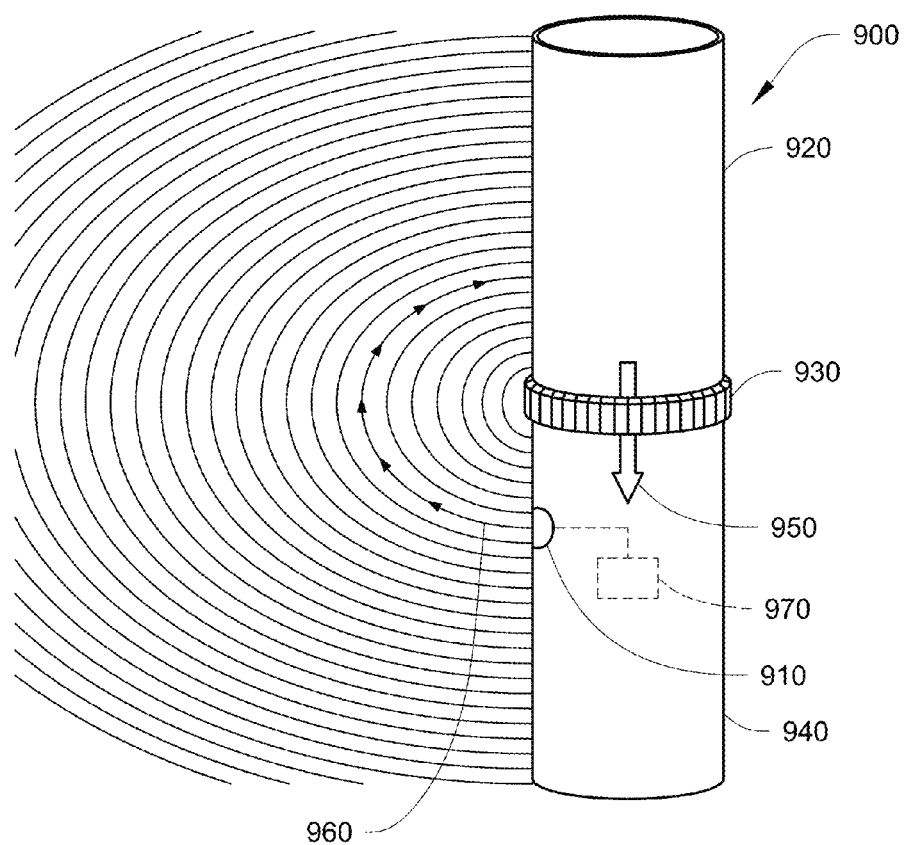

FIG. 9 illustrates a side view of a portion of a downhole tool that includes a transformer, according to one embodiment.

Figure 10:
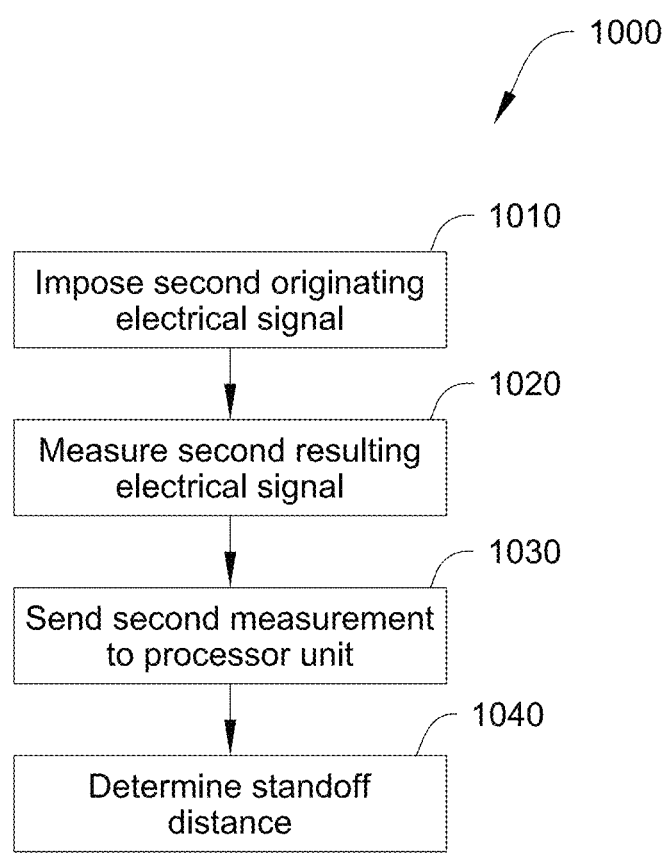

FIG. 10 illustrates one embodiment of a flow chart for estimating a standoff between a surface of a downhole tool to a surface of a geological formation according to a second approach.

Figure 11:
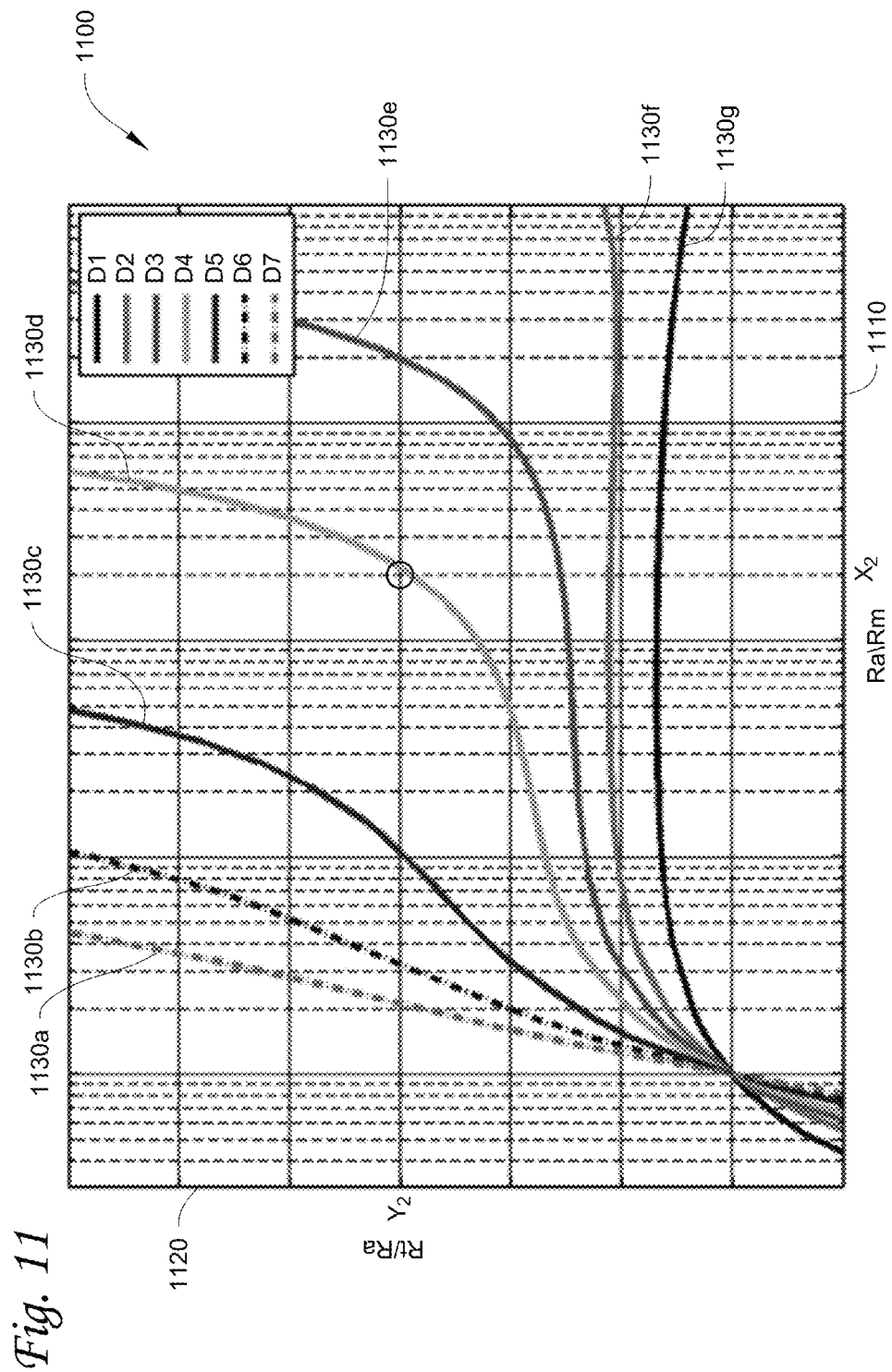

FIG. 11 illustrates an example of a graph of a predetermined modeled tool response of an electrode arrangement using a second approach, according to one embodiment.

Figure 12:
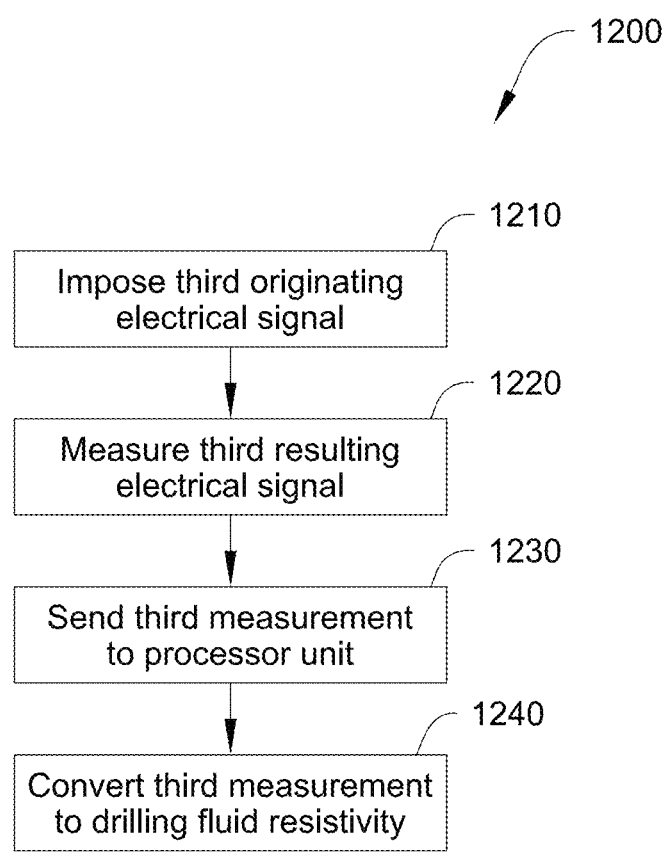

FIG. 12 illustrates a flow chart for estimating a drilling fluid resistivity, according to one embodiment.

Figure 13:
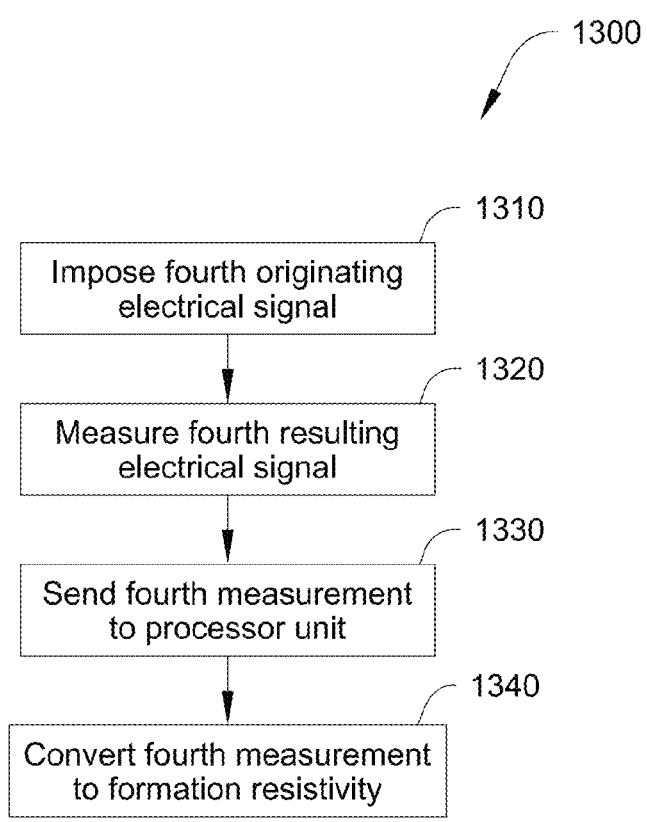

FIG. 13 illustrates a flow chart for estimating a formation resistivity, according to one embodiment.

DETAILED DESCRIPTION

The embodiments provided herein are directed to methods and systems for estimating a standoff between a downhole tool and a geological formation.

Specific details are given in the following description to provide a thorough understanding of the embodiments. However, it will be understood by one of ordinary skill in the art that the embodiments may be practiced without these specific details. For example, circuits, systems, methods, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc.

The embodiments provided herein include methods and systems for estimating a standoff between a downhole tool and a geological formation. In particular, embodiments are provided herein for estimating a standoff between a surface of a downhole tool and a surface of the geological formation, for example, when a channel between the tool and the formation is filled with drilling fluid, e.g., water-based mud. While the embodiments described herein show a Measurement-While-Drilling (MWD)/Logging-While-Drilling (LWD) tool as the downhole tool, it will be appreciated that other downhole tools such as a wireline tool, coiled tubing tool, testing tool, production tool and the like may also be used with the methods and systems described herein.

In the embodiments described herein, the standoff can be determined from electrical measurements performed by a standoff measurement system having a downhole tool (e.g., a drilling tool) disposed in a borehole. In some embodiments, components of the standoff measurement system (e.g., an electrode component and a transformer) can be exposed from a circumferential surface of the downhole tool. In those cases where a drilling tool is used, as the drilling tool rotates inside the borehole, an electrode component of the standoff measurement system occupies different angular positions and/or varying distances/standoffs from the borehole wall. A measurement sequence can be repeated at a certain number of positions where the standoff may be determined by matching signal data retrieved from the standoff measurement system against a predetermined modeled tool response. In some embodiments, the drilling tool is a logging-while-drilling tool. In other embodiments, the drilling tool is a measurement-while-drilling tool. Also, in some embodiments, the drilling tool is a combination of a logging-while-drilling tool and a measurement-while-drilling tool.

In particular, the embodiments provided herein describe two measurement approaches that can be used for obtaining a standoff between a surface of the downhole tool and a surface of the borehole. The first approach can be performed when the standoff between the borehole wall and the downhole tool is, for example, no more than about six times the spacing distance between two electrodes of an electrode component of the standoff measurement system that are to be used to measure the standoff. The second approach can be performed when the standoff between the borehole wall and the downhole tool is, for example, no less than about two times the spacing distance between the two electrodes of the electrode component of the standoff measurement system that are to be used to measure the standoff and, for example, up to about one order of magnitude larger than the spacing distance between the two electrodes of the electrode component.

When a measurement is taken using the first approach, the measurement can be particularly sensitive to the resistivity of the drilling fluid, or to the combination of the resistivity of the drilling fluid, the resistivity of the formation and the standoff. When a measurement is taken using the second approach, the measurement can be particularly sensitive to the combination of the resistivity of the drilling fluid, the resistivity of the formation, and to standoff. For each approach, as discussed in more detail below, when the resistivity of the drilling fluid and the resistivity of the formation are known or estimated, an accurate standoff can be determined.

Figure 1A:
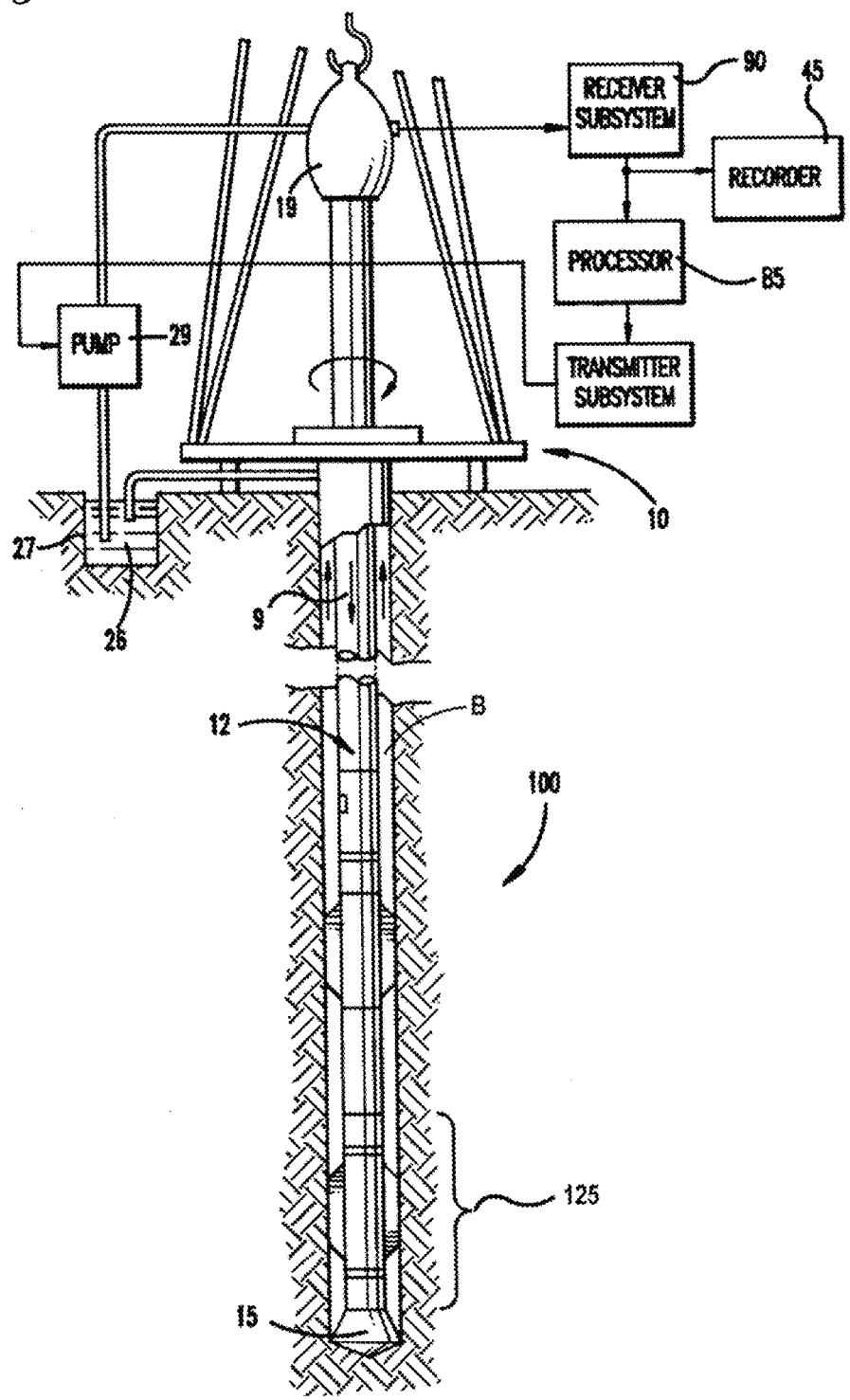
FIG. 1A is a schematic diagram, partially in block form, of a measuring-while-drilling or logging-while-drilling tool in accordance with one embodiment.

Referring to FIG. 1A, there is illustrated one embodiment of a logging-while-drilling or measurement-while-drilling tool 100 that includes a standoff measurement system, according to one embodiment. As used herein, and unless otherwise specified, logging-while-drilling or measurement-while-drilling is intended to include the taking of logs (e.g., formation resistivity data) or measurements (e.g., downhole pressure data), for example, in an earth borehole, with the drill bit and at least some of the drill string in the borehole, during drilling, pausing, and/or tripping. A platform and derrick 10 can be positioned over a borehole B that is formed in the earth by rotary drilling. A drill string 12 is suspended within the borehole B and includes a drill bit 15 at its lower end. Drilling fluid 26 can be contained in a pit 27 in the earth. A pump 29 pumps the drilling fluid 26 into the drill string 12 via a port in a swivel 19 to flow downward (arrow 9) through the center of drill string 12. Mounted within the drill string 12, for example near the drill bit 15, is a bottom hole drilling tool/assembly 100 which can include capabilities for measuring, processing and storing information, and communicating with the earth's surface. As used herein, near the drill bit means within several drill collar lengths from the drill bit. A drill collar length can be the length of component of a drill string that provides weight on a drilling bit. In some embodiments, several drill collar lengths can be, e.g., about 120 feet (about 37 meters). The drilling tool 100 includes a measurement component 125 which is described in further detail below.

The measurement component 125 is coupled to an above hole receiving subsystem 90 which can then be coupled to a processor unit 85 and a recorder 45. Measurements obtained by the measurement component 125 can thereby be sent to the processor unit 85 for determining a standoff between the drilling tool 100 and the borehole wall. The drilling tool 100 with the measurement component 125 and combined with the processor unit 85 can be a standoff measurement system. It will be understood that different acoustic or other techniques can be employed for communication with the surface of the earth. In this example, the standoff measurements are sent to the earth's surface for processing, storage and/or display. It will be appreciated that the standoff measurements can also be processed downhole using, e.g., one or more downhole processors, and results stored downhole with a storage medium for later retrieval or sent to the surface for further analysis.

As shown in FIG. 1A, a drilling tool can be positioned in a land based rig. It will be appreciated that other downhole tools (e.g., wireline, coiled tubing, testing, production, or a combination thereof, etc.) can also be deployed from a land based rig or offshore platform.

Figure 1B:
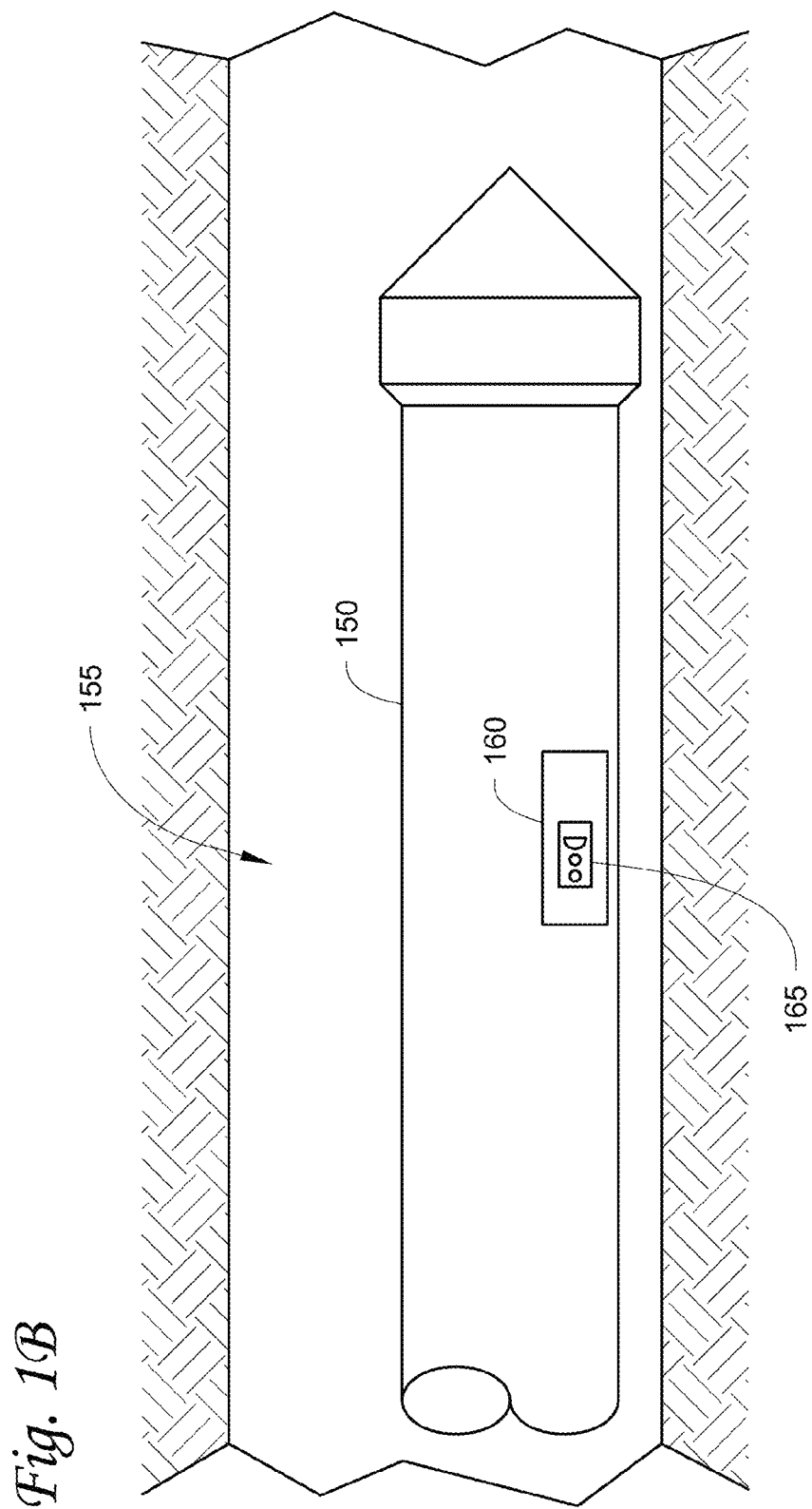
FIG. 1B is a schematic diagram of a drilling tool disposed in a horizontal borehole, according to one embodiment.

While the drilling tool 100 in FIG. 1A is suspended vertically in a generally vertically formed borehole B, FIG. 1B provides a drilling tool 150 disposed horizontally in a generally horizontally formed borehole 155. In these embodiments, due to gravity, the drilling tool 150 can be located near a bottom side of the horizontal borehole 155. Accordingly, in some embodiments, as the drilling tool 150 rotates within the borehole 155, when an electrode component 165 of a measurement component 160 is exposed from a surface of the drilling tool 150 near the bottom side of the generally horizontal borehole 155, a measurement using the first approach can be obtained from which the standoff can be determined. Also, in some embodiments, when the electrode component 165 of the measurement component 160 is exposed from a surface of the drilling tool 160 near a top side of the generally horizontal borehole 165, a measurement using the second approach can be obtained from which the standoff and/or a resistivity of the drilling fluid can be determined.

Figure 2:
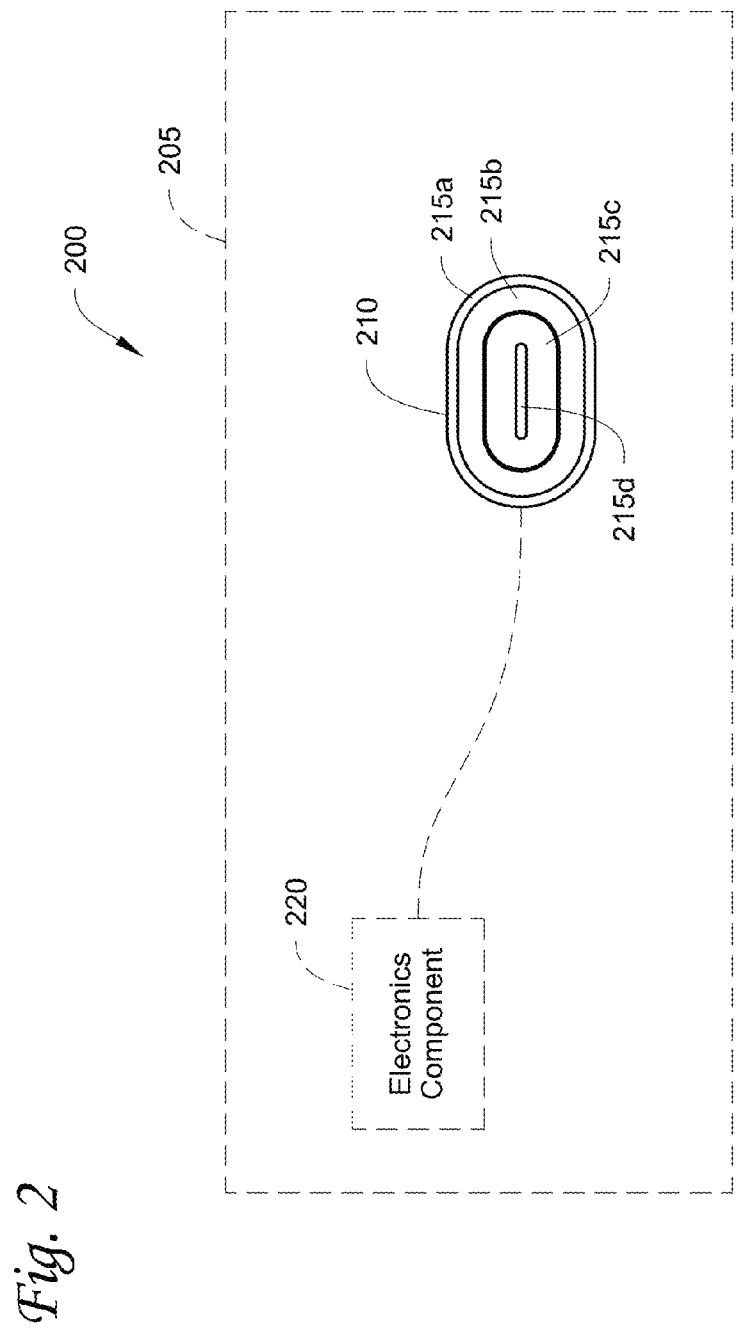
FIG. 2 illustrates a side view of a portion of a downhole tool, according to one embodiment.

FIG. 2 illustrates a side view of a portion of a drilling tool 200 that shows a portion of a measurement component 205 according to one embodiment. The measurement component 205 includes an electrode component 210 and an electronics component 220. The electronics component 220 is operatively connected to the electrode component 210 and can be located within the drilling tool 200 or at the earth's surface. The electrode component 210 in FIG. 2 includes four concentric electrodes 215a, 215b, 215c and 215d, for example, in a button configuration. In one embodiment, the electrodes 215b and 215c are measurement electrodes and the electrodes 215a and 215d are source electrodes. The measurement component 205 can also include one or more transformers (not shown), additional electronics components (not shown) and one or more processor units (not shown). In this embodiment, the spacing distance between the two measurement electrodes 215b and 215c is typically on the order of a tenth of an inch (.25 cm). In other embodiments, the spacing distance between the two measurement electrodes can be selected depending on the specific application.

In some embodiments, the electrode component 210 may include two electrodes. FIG. 3 provides a top view of a two electrode button 300 that includes electrodes 311a, 311b, according to one embodiment. While the electrodes 215a-d are arranged in concentric elliptical rings and the electrodes 311a-b are arranged in circular rings, in other embodiments the electrodes can be arranged in other shapes, such as rectangular rings, irregularly shaped rings, etc. Also, in some other embodiments, the electrodes can be replaced with two or more electrodes that are not concentric but are still arranged to perform a current and/or voltage measurement.

For example, FIG. 4 provides a top view of an electrode component 400 that includes a source electrode 411a and eight measurement electrodes 411b that are spatially arranged to perform a current and/or voltage measurement.

In some embodiments, the electrode component can span the entire circumference around the surface of the downhole tool. In these embodiments, measurements may be sensitive to the average standoff of the borehole, and therefore the average diameter of the borehole. In other embodiments, the electrode component can include two or more electrodes located approximate each other and exposed from the surface of the downhole tool.

FIG. 5 illustrates a flow chart 500 for estimating a standoff between a surface of a downhole tool (e.g. a drilling tool) to a surface of a geological formation (e.g. a borehole wall), according to a first approach. The process shown in FIG. 5 can be used, for example, by a standoff measurement system that includes, for example, the measurement component 205. In the first approach, a standoff can be determined when the distance between the surfaces of the geological formation and the downhole tool is expected to be no more than about a first distance. In the measurement component 205, the first distance can be, for example, about six times the spacing distance between the two measurement electrodes 215b and 215c of the electrode component 210.

For example, when the downhole tool is disposed in a generally horizontal borehole and the diameters of the downhole tool and the borehole are about 5 inches (12.7 cm) and about 6⅛ inches (15.6 cm) respectively, the maximum standoff that can be expected, for example, when the electrode component 210 is facing the top side of the borehole wall, can be about 1¼ inches (3.2 cm), assuming that the electrode is slightly recessed by about ⅛ inch (0.3 cm) with respect to the diameter of the tool. The minimum standoff that can be expected, for example, when the electrode component 210 is facing the bottom side of the borehole wall, can be about ⅛ inch (0.3 cm). Accordingly, if the distance between the two measurement electrodes 215b and 215c of the electrode component 210 is on the order of about a tenth of an inch (0.25 cm), an accurate standoff can be determined, for example, when the electrode component 210 faces roughly the bottom side of the borehole wall.

The accuracy of a standoff measurement can be based on the amount of error from the actual standoff. In some embodiments, the standoff can be determined with an accuracy of less than about twenty percent error from the actual standoff. In other embodiments, the standoff can be determined with an accuracy of less than about ten percent error from the actual standoff. In yet some other embodiments, the standoff can be determined with an accuracy of less than about five percent error from the actual standoff.

The flowchart 500 begins at 510 where an electronics component imposes a first originating electrical signal at an electrode component having two or more electrodes. In some embodiments, the first originating electrical signal is a voltage applied between two electrodes of the electrode component. In other embodiments, the first originating electrical signal can be a current signal.

At 520, the electronics component measures a first resulting electrical signal, generated as a result of the first originating electrical signal, at the electrode component to obtain a first measurement. For example, when the first originating electrical signal is a voltage applied between two source electrodes of the electrode component, the first resulting electrical signal can be a current measured at a measurement electrode of the electrode component. When the first originating electrical signal is a current applied at a source electrode of the electrode component, the first resulting electrical signal can be a voltage measured between two measurement electrodes of the electrode component.

At 530, the first measurement is sent to a processor unit, such as the processor unit 85 in FIG. 1 or a processor unit disposed within the downhole tool. At 540, the processor unit fits the first measurement to a predetermined modeled tool response to determine the standoff between a surface of the geological formation and a surface of the downhole tool. In some embodiments, the processor unit determines a modeled tool response based on an expected or measured value of the contact impedance of the electrodes of the electrode component and measured or estimated values of the drilling fluid resistivity and the formation resistivity. The modeled tool response can also be obtained using a computer simulation. Those skilled in the art would understand how to use a computer simulation to obtain a modeled tool response. In some embodiments, the processor unit fits the first measurement to a predetermined modeled tool response using an interpolation process to determine the standoff. In other embodiments, the processor unit fits the first measurement to a predetermined modeled tool response using a data inversion process. Those skilled in the art would understand how to use a data inversion process to fit the first measurement to the predetermined modeled tool response.

When, for example, the electrode component includes two source electrodes and two measurement electrodes, the electronics component can impose a first originating electrical signal between the two source electrodes and the first resulting electrical signal can be measured at the two measurement electrodes.

When, for example, the electrode component includes one source electrode and one measurement electrode, the electronics component can impose a first originating electrical signal between the source electrode and the measurement electrode and the first resulting electrical signal can be measured at the measurement electrode.

In some embodiments, the first measurement is a conductance obtained by dividing the first resulting electrical signal by the first originating electrical signal when the first resulting electrical signal is a current measured at a measurement electrode of the electrode component and the first originating electrical signal is a voltage applied between two source electrodes of the electrode component; or by dividing the first originating electrical signal by the first resulting electrical signal when the first resulting electrical signal is a voltage measured between two measurement electrodes and the first originating electrical signal is a current applied at a source electrode of the electrode component.

FIG. 6 illustrates one example of a modeled tool response plotted on a graph 600. The horizontal axis 610 represents the formation resistivity Rt normalized by the drilling fluid resistivity Rm. The vertical axis 620 represents the first measurement determined using the first approach, for example, at 520 of FIG. 5. In this embodiment, the obtained first measurement is a conductance S. Each of simulated curves 630a-g respectively represents a different standoff ($D_1$-$D_7$) between the surface of the downhole tool and the surface of the geological formation. With the graph 600, a standoff can be interpolated when the conductance S and the formation resistivity normalized by the drilling fluid resistivity Rt/Rm are known or determined. For example, if the measured conductance S is $Y_1$ and the ratio Rt/Rm is $X_1$, the standoff can be determined as a distance about $D_7$ represented on curve 630a (see open circle). Measurements for determining the formation resistivity and the drilling fluid resistivity are described in more detail below.

FIG. 7 illustrates a standoff computation chart 700 indicating the accuracy of determining a standoff between a surface of the downhole tool and a surface of the geological formation when applying the first approach. In this embodiment, the downhole tool is disposed in a generally horizontal borehole. The vertical and horizontal axes represent distances from the center of the downhole tool. The downhole tool line 710 represents an outer surface of the downhole tool, such as the drilling tool 100. The line 720 represents a reduced outer surface of the downhole tool where the electrode component may be exposed. The standoff circles 730 represent the standoffs determined using the first approach and include error bars 735 indicating the amount of uncertainty of the standoff measurements. An ellipsoid fit line 740 can be provided to determine the shape of the complete borehole. As seen in FIG. 7, at larger standoffs between the downhole tool line 710 and the ellipsoid fit line 740 (e.g. where the distance between the outer surface of the downhole tool and the borehole wall is, for example, no less than about two times the spacing distance between two measurement electrodes of the electrode component of the standoff measurement system), the determined standoff circles 730 can include larger error bars 735 to indicate larger uncertainties in the standoff. At smaller standoffs between the downhole tool line 710 and the ellipsoid fit line 740 (e.g. where the distance between the outer surface of the drill tool and the borehole wall is no more than about six times the spacing distance between two measurement electrodes of the electrode component of the standoff measurement system), the determined standoff circles 730 can include smaller error bars 735 to indicate that a more accurate standoff can be determined.

For example, at point $A_1$ on the ellipsoid fit line 740 there is a relatively small standoff between the outer surface of the downhole tool and the borehole wall. At point $A_2$ on the ellipsoid fit line 740, there is a relatively large standoff between the outer surface of the downhole tool and the borehole wall. Accordingly, when using the first approach, the error bar 735 at point $A_1$ can be smaller than the error bar 735 at point $A_2$.

The accuracy of a standoff measurement can be based on the amount of error from the actual standoff. In some embodiments, the standoff can be determined using the first approach with an accuracy of less than about twenty percent error from the actual standoff. In other embodiments, the standoff can be determined using the first approach with an accuracy of less than about ten percent error from the actual standoff. In yet some other embodiments, the standoff can be determined using the first approach with an accuracy of less than about five percent error from the actual standoff.

FIG. 8 illustrates a side view of a portion of a downhole tool 800 that shows a portion of a measurement component according to one embodiment. The standoff measurement system includes an electrode component 810, an electronics component 820, and a plurality of transformers 830a-e. The electronics component 820 is operatively connected to the electrode component 810 and is located within the downhole tool 800. The electrode component 810 in FIG. 8 includes four concentric electrodes, for example, in a button configuration, similar to the electrode component 210 shown in FIG. 2.

In some embodiments, the electrode component 810 may include two source electrodes and two measurement electrodes. In this case, the second resulting electrical signal can be measured at one of the measurement electrodes. In some embodiments, the electrode component can include one source electrode and one measurement electrode. In this case, the second resulting electrical signal can be measured at the measurement electrode.

In other embodiments, the electrode component 810 may include two concentric electrodes, such as shown in FIG. 3. Also, while the electrodes in the electrode component 810 are arranged in concentric elliptical rings, in other embodiments the electrodes can be arranged in other shapes, such as rectangular rings, circular rings, irregularly shaped rings, etc. Also, as shown in FIG. 4, in some other embodiments, the electrodes can be replaced with two or more physically separate electrodes that are not concentric but are spatially arranged to perform a current and/or voltage measurement.

In this embodiment, each of the transformers 830a-e can be, for example, toroidal shaped and can have a metal core with a wound wire around it (not shown). The electronics component 820 can drive each of the transformers 830a-e. In particular, the electronics component 820 applies a voltage or a current to the wire wound around the metal core, which generates a magnetic field in the metal core. The driven transformer 830a-e can accordingly act, for example, as a primary portion of a transformer. The downhole tool 800, the drilling fluid and the geological formation can therefore act, for example, as a secondary portion of the transformer that has a one-turn winding. Accordingly, one or more transformers on the downhole tool 800 can be easily installed.

When a voltage or current is applied to one of the transformers 830a-e (e.g. "the activated transformer"), a voltage is imposed between two parts of the downhole tool 800 on either side of the activated transformer. The different voltages can create an axial current and a plurality of radial currents along the downhole tool 800. For example, as shown in FIG. 9, an axial current 950 passes over the surface of a downhole tool 900, and a plurality of radial currents, including a radial current 960, travel out of the downhole tool 900 from one side 940 of a transformer 930, to the drilling fluid and the formation and then returns to the downhole tool 900 on the opposite side 920 of the transformer 930. The radial current 960 passes through to the downhole tool 900 at an electrode component 910. An electronics component 970 that is operatively connected to the electrode component 910 can then measure the current 960 passing through the electrode component 910. In some embodiments, the electrode component 910 can be a single electrode and can take any shape. In some embodiments, the electrode component 910 can be a ring around the circumference of the downhole tool 900. As shown in FIG. 9, the further the electrode component 910 is placed away from the transformer 930, the deeper the current 960 can penetrate the formation. Accordingly, when the electrode component 910 is located close to the transformer 930, the sensitivity to both the drilling fluid resistivity and the standoff can be increased. As the distance between the electrode component 910 and the transformer 930 increases, the sensitivity to the formation resistivity increases relative to the standoff and the drilling fluid resistivity.

FIG. 10 illustrates a flow chart 1000 for estimating a standoff between a surface of a downhole tool (e.g. a drilling tool) and a surface of a geological formation (e.g. a borehole wall), according to a second approach. The process shown in FIG. 10 can be used, for example, by a standoff measurement system that includes, for example, the measurement component shown in FIGS. 8 and/or 9. In the second approach, a standoff can be determined accurately by obtaining a second measurement that is sensitive to a combination of a formation resistivity, a drilling fluid resistivity and a standoff between the downhole tool and the geological formation.

The flowchart 1000 begins at 1010 where an electronics component imposes a second originating electrical signal at a transformer that is located at a position on the downhole tool that is spaced from an electrode component such that the second measurement is sensitive to a combination of a formation resistivity, a drilling fluid resistivity and a standoff between the downhole tool and the geological formation. In some embodiments, the second originating electrical signal is a voltage applied at the transformer. In other embodiments, the second originating electrical signal can be a current applied to the transformer.

At 1020, the electronics component measures a second resulting electrical signal, generated as a result of the second originating electrical signal, at the electrode component to obtain a second measurement. In some embodiments, the second measurement is a resistance that is sensitive to a combination of the standoff, the drilling fluid resistivity and the formation resistivity. In some embodiments, the second resulting electrical signal can be a current measured at an electrode of the electrode component.

At 1030, the second measurement is sent to a processor unit, such as the processor unit 85 in FIG. 1 or a processor unit disposed within the downhole tool. At 1040, the processor unit fits the second measurement to a second predetermined modeled tool response to determine the standoff between the surface of the geological formation and the surface of the downhole tool where the electrode component is located. In some embodiments, the processor unit fits the second measurement to a predetermined modeled tool response using an interpolation process to determine the standoff. In some embodiments, the processor unit determines a modeled tool response based on an expected or measured value of the contact impedance of the electrodes of the electrode component and a measured or estimated value of the drilling fluid resistivity. The modeled tool response can also be obtained using a computer simulation. In other embodiments, the processor unit fits the second measurement to a predetermined modeled tool response using a data inversion process.

FIG. 11 illustrates one example of a modeled tool response plotted on a graph 1100. The horizontal axis 1110 represents the second measurement Ra obtained using the second approach (determined, for example, at 1020) normalized by the drilling fluid resistivity Rm. The vertical axis 1120 represents the formation resistivity Rt normalized by the second measurement Ra. Each of simulated curves 1130*a-g* represents a different standoff ($D_1$-$D_7$) between the surface of the downhole tool and the surface of the geological formation. With the graph 1100, a standoff can be interpolated when the measured resistance Ra, the formation resistivity Rt and the drilling fluid resistivity Rm are known or determined. For example, if a ratio Rt/Ra is $Y_2$ and a ratio Ra/Rm is $X_2$, the standoff can be determined as a distance about $D_4$ represented on curve 1130*d* (see open circle).

The accuracy of a standoff measurement can be based on the amount of error from the actual standoff. In some embodiments, the standoff can be determined using the second approach with an accuracy of less than about twenty percent error from the actual standoff. In other embodiments, the standoff can be determined using the second approach with an accuracy of less than about ten percent error from the actual standoff. In yet some other embodiments, the standoff can be determined using the second approach with an accuracy of less than about five percent error from the actual standoff.

In some embodiments, when the standoff is expected to be, for example, no more than about the first distance and, for example, no less than about the second distance, both the first approach and the second approach can be used to determine the standoff. In these instances, the standoff measurement system can determine which approach is more accurate based on, for example, a predetermined modeled tool response. That is, based on a predetermined modeled tool response, the standoff measurement system can determine the amount of uncertainty in determining the standoff using the first approach and the amount of uncertainty in determining the standoff using the second approach. Thus, the standoff measurement system can select between the standoff determined using the first approach and the standoff determined using the second approach based on which approach has a lesser amount of uncertainty in the calculation.

In some embodiments, a magnetometer can be used to determine the position of the electrode component exposed from the surface of the downhole tool with respect to an orientation of the downhole tool inside the borehole. It will be appreciated that the embodiments provided herein can use other suitable devices/methods to determine the position of the electrode component.

Measurements for determining the formation resistivity and the drilling fluid resistivity are now described in more detail. As discussed above, in order to obtain the standoff using the first approach or the second approach, one may find it useful to determine the resistivity of the drilling fluid Rm and/or the resistivity of the formation Rt. The drilling fluid resistivity can be measured using the embodiments discussed below with respect to FIG. 12. However, in some embodiments, the drilling fluid resistivity can also be obtained, for example, from drilling fluid samples, or in a separate measurement obtained by a separate measurement system of the downhole tool.

Similarly, the formation resistivity can be obtained using the embodiments described below with respect to FIG. 13. However, in some embodiments, the formation resistivity can also be obtained, for example, as a separate measurement obtained by a separate measurement system, tool or device that may or may not be a part of the downhole tool. In some circumstances, the drilling fluid resistivity and the formation resistivity are determined from the same measurement.

FIG. 12 illustrates a flow chart 1200 for estimating a drilling fluid resistivity. The process shown in FIG. 12 can be used, for example, by a standoff measurement system that includes, for example, the measurement component 205. In the second approach, a drilling fluid resistivity can be determined accurately when the distance between the surfaces of the geological formation and the downhole tool is expected to be no less than about a second distance. In the measurement component 205, the second distance can be, for example, about two times the spacing distance between the two measurement electrodes 215*b* and 215*c* of the electrode component 210.

The flowchart 1200 begins at 1210 where an electronics component imposes a third originating electrical signal at an electrode component. In some embodiments, the third originating electrical signal is a voltage applied between two electrodes of the electrode component. In other embodiments, the third originating electrical signal can be a current signal.

At 1220, the electronics component measures a third resulting electrical signal, generated as a result of the third originating electrical signal, at the electrode component to obtain a third measurement that is sensitive to the resistivity of drilling fluid between the downhole tool and the geological formation. For example, when the third originating electrical signal is a voltage applied between two source electrodes of the electrode component, the third resulting electrical signal is a current measured at a measurement electrode of the electrode component. When the third originating electrical signal is a current applied at a source electrode of the electrode component, the third resulting electrical signal is a voltage measured between two measurement electrodes of the electrode component.

At 1230, the third measurement is sent to a processor unit, such as, for example, the processor unit 85 in FIG. 1 or a processor unit disposed within the downhole tool. At 1240, the processor unit converts the third measurement into a drilling fluid resistivity. In some embodiments, the processor unit converts the third measurement into the drilling fluid resistivity using a conversion factor that can be determined using a mathematical simulation. Those skilled in the art would understand how to use a mathematical simulation to determine a conversion factor for converting the third measurement into the drilling fluid resistivity.

In some embodiments, the electrode component can include two source electrodes and two measurement electrodes. In these embodiments, the electronics component can impose a third originating electrical signal between the two source electrodes. In other embodiments, the electrode component can include one source electrode and one measurement electrode. In these embodiments, the electronics component can impose a third originating electrical signal between the source electrode and the measurement electrode.

In those embodiments where the electrode component includes two source electrodes and two measurement electrodes, the third resulting electrical signal can be measured at one or both of the two measurement electrodes. In those embodiments where the electrode component includes one source electrode and one measurement electrode, the third resulting electrical signal is measured at the measurement electrode.

In some embodiments, the third measurement is a resistance obtained by dividing the third originating electrical signal by the third resulting electrical signal when the third resulting electrical signal is a current measured, for example, at a measurement electrode of the electrode component and the third originating electrical signal is a voltage applied between, for example, two source electrodes of the electrode component; or by dividing the third resulting electrical signal by the third originating electrical signal when the third resulting electrical signal is a voltage measured between, for example, the two measurement electrodes of the electrode component and the third originating electrical signal is a current applied at a source electrode of the electrode component.

FIG. 13 illustrates a flow chart 1300 for estimating a formation resistivity. The process shown in FIG. 13 can be used, for example, by the standoff measurement system shown in FIG. 8. In these embodiments, the formation resistivity can be determined accurately by obtaining a fourth measurement that is sensitive to a formation resistivity relative to a drilling fluid resistivity and a standoff between the downhole tool and the geological formation.

The flowchart 1300 begins at 1310 where an electronics component imposes a fourth originating electrical signal at a transformer that is located at a position on a downhole tool and that is spaced from an electrode component disposed on the downhole tool such that the fourth measurement is sensitive to the formation resistivity relative to the drilling fluid resistivity and the standoff between the downhole tool and the borehole wall. In some embodiments, the fourth originating electrical signal is a voltage applied at the transformer. In other embodiments, the originating electrical signal can be a current applied to the transformer.

At 1320, the electronics component measures a fourth resulting electrical signal, generated as a result of the fourth originating electrical signal, at the electrode component to obtain a fourth measurement. In some embodiments, the fourth measurement is a resistance that is sensitive to the formation resistivity. In some embodiments, the fourth resulting electrical signal can be a current measured at an electrode of the electrode component.

At 1330, the fourth measurement is sent to a processor unit, such as the processor unit 85 in FIG. 1 or a processor unit disposed within the downhole tool. At 1340, the processor unit converts the fourth measurement into a formation resistivity. In some embodiments, the processor unit converts the fourth measurement into the formation resistivity using a conversion factor that can be determined using a mathematical simulation.

In some embodiments, the electrode component can include two source electrodes and two measurement electrodes. In this case, the fourth resulting electrical signal can be measured at one or both of the two measurement electrodes. In some embodiments, the electrode component can include one source electrode and one measurement electrode. In this case, the fourth resulting electrical signal is measured at the measurement electrode.

While the embodiments of FIGS. 2-7 and 12 are described separately from the embodiments of FIGS. 8-11 and 13, one skilled in the art can combine measurements and data obtained in these embodiments as desired and/or required for the specific application.

Aspects:

It is noted that any of aspects 1-9 below can be combined with any of aspects 10-19.

1. A method for determining a standoff between a surface of a downhole tool and a surface of a geological formation, the method comprising:
    providing the downhole tool that includes an electrode component exposed from a surface of the downhole tool, one or more transformers exposed from the surface of the downhole tool, and one or more electronics components;
    when the standoff between the surface of the geological formation and the surface of the downhole tool is expected to be no more than a first distance:
        imposing, using at least one of the electronics components, a first originating electrical signal at the electrode component,
        measuring, using at least one of the electronics components, a first resulting electrical signal at the electrode component to obtain a first measurement, the first resulting electrical signal generated as a result of the first originating electrical signal, and
        fitting, using one or more processor units, the first measurement to a first modeled tool response to determine a first standoff between the surface of the downhole tool and the surface of the geological formation; and/or
    when the standoff between the surface of the geological formation and the surface of the downhole tool is expected to be no less than a second distance:
        imposing, using at least one of the electronics components, a second originating electrical signal at a first transformer,
        measuring, using at least one of the electronics components, a second resulting electrical signal at the electrode component to obtain a second measurement, the second resulting electrical signal generated as a result of the second originating electrical signal, and
        fitting, using one or more processor units, the second measurement to a second modeled tool response to determine a second standoff between the surface of the downhole tool and the surface of the geological formation.

2. The method of aspect 1, wherein the first distance is no more than six times the spacing distance between two electrodes of the electrode component and the second distance is no less than two times the spacing distance between the two electrodes of the electrode component.

3. The method of aspects 1-2, further comprising, when the standoff is expected to be no more than the first distance and no less than the second distance,
    determining an amount of uncertainty in the first standoff and an amount of uncertainty in the second standoff, and selecting between the first standoff and the second standoff based upon the amount of uncertainty determined in the first standoff and the amount of uncertainty determined in the second standoff.

4. The method of aspects 1-3, further comprising:
imposing, using at least one of the electronics components, a third originating electrical signal at the electrode component when the standoff between the surface of the geological formation and the surface of the downhole tool is expected to be no less than the second distance;
measuring, using at least one of the electronics components, a third resulting electrical signal at the electrode component to obtain a third measurement that is sensitive to a resistivity of a drilling fluid disposed between the downhole tool and the surface of the geological formation, the third resulting electrical signal generated as a result of the third originating electrical signal; and
fitting, using at least one of the processor units, the third measurement to the first modeled tool response to determine the first standoff between the surface of the downhole tool and the surface of the geological formation and/or fitting, using at least one of the processor units, the third measurement to the second modeled tool response to determine the second standoff between the surface of the downhole tool and the surface of the geological formation.

5. The method of aspects 1-4, further comprising:
imposing, using at least one of the electronics components, a fourth originating electrical signal at a second transformer;
measuring, using at least one of the electronics components, a fourth resulting electrical signal at the electrode component to obtain a fourth measurement that is sensitive to a resistivity of the formation, the fourth resulting electrical signal generated as a result of the fourth originating electrical signal; and
fitting, using at least one of the processor units, the fourth measurement to the first modeled tool response to determine the first standoff between the surface of the downhole tool and the surface of the geological formation and/or fitting, using at least one of the processor units, the fourth measurement to the second modeled tool response to determine the second standoff between the surface of the downhole tool and the surface of the geological formation.

6. The method of aspects 1-5, wherein fitting, using at least one of the processor units, the first measurement to the first modeled tool response and fitting, using at least one of the processor units, the second measurement to the second modeled tool response respectively comprise applying a data inversion process adapted to reduce an error between the first measurement and the first modeled tool response and to reduce an error between the second measurement and the second modeled tool response.

7. The method of aspects 1-6, wherein imposing, using at least one of the electronics components, the first originating electrical signal at the electrode component includes:
imposing a voltage between two source electrodes of the electrode component;
wherein measuring, using at least one of the electronics components, the first resulting electrical signal at the electrode component includes:
measuring a current between two measurement electrodes of the electrode component; and
wherein measuring, using the at least one electronics component, the second resulting electrical signal at the electrode component includes:
measuring a current using at least one of the two measurement electrodes of the electrode component.

8. The method of aspects 1-7, wherein imposing, using least one of the electronics components, the first originating electrical signal at the electrode component includes:
imposing a voltage between a source electrode and a measurement electrode of the electrode component;
wherein measuring, using at least one of the electronics components, the first resulting electrical signal at the electrode component includes:
measuring a current at the measurement electrode; and
wherein measuring, using at least one of the electronics components, the second resulting electrical signal at the electrode component includes:
measuring a current at the measurement electrode.

9. The method of aspects 1-8, wherein the downhole tool is a logging-while-drilling tool, a measurement-while-drilling tool, or a combination thereof.

10. A system for determining a standoff between a surface of a downhole tool and a surface of a geological formation, the system comprising:
the downhole tool including:
an electrode component exposed from the surface of the downhole tool;
one or more transformers exposed from the surface of the downhole tool;
and
one or more electronics components adapted to:
when the distance between the surface of the geological formation and the surface of the downhole tool is expected to be no more than a first distance:
impose a first originating electrical signal at the electrode component, and
measure a first resulting electrical signal at the electrode component to obtain a first measurement, the first resulting electrical signal generated as a result of the first originating electrical signal, and/or
when the distance between the surface of the geological formation and the surface of the downhole tool is expected to be no less than a second distance:
impose a second originating electrical signal at least one of the transformers, and
measure a second resulting electrical signal at the electrode component to obtain a second measurement, the second resulting electrical signal generated as a result of the second originating electrical signal;
one or more processor units adapted to:
fit the first measurement to a first modeled tool response to determine a first standoff between the surface of the downhole tool and the surface of the geological formation, and/or
fit the second measurement to a second modeled tool response to determine a second standoff between the surface of the downhole tool and the surface of the geological formation.

11. The system of aspect 10, wherein the first distance is six times the spacing distance between two electrodes of the electrode component and the second distance is two times the spacing distance between the two electrodes of the electrode component.

12. The system of aspects 10-11, wherein at least one of the processor units is adapted to, when the standoff is expected to be no more than the first distance and no less than the second distance,
determine an amount of uncertainty in the first standoff and an amount of uncertainty in the second standoff, and select between the first standoff and the second standoff based upon the amount of uncertainty determined in the first standoff and the amount of uncertainty determined in the second standoff.

13. The system of aspects 10-12, wherein at least one of the electronics components is further adapted to:

impose a third originating electrical signal at the electrode component when the distance between the surface of the geological formation and the surface of the downhole tool is expected to be no less than two times the spacing distance between two electrodes of the electrode component, and measure a third resulting electrical signal at the electrode component to obtain a third measurement that is sensitive to a resistivity of a drilling fluid disposed between the downhole tool and the surface of the geological formation, the third resulting electrical signal generated as a result of the third originating electrical signal; and wherein at least one of the processor units is further adapted to fit the third measurement to the first modeled tool response to determine the first standoff and/or fit the third measurement to the second modeled tool response to determine the second standoff 14. The system of aspects 10-13, wherein at least one of the electronics components is further adapted to:

impose a fourth originating electrical signal at a second transformer, and measure a fourth resulting electrical signal at the electrode component to obtain a fourth measurement that is sensitive to a resistivity of the formation, the fourth resulting electrical signal generated as a result of the fourth originating electrical signal; and wherein at least one of the processor units is further adapted to fit the third measurement to the first modeled tool response to determine the first standoff and/or fit the third measurement to the second modeled tool response to determine the second standoff 15. The system of aspects 10-14, wherein the electrode component includes two source electrodes and two measurement electrodes, the two measurement electrodes being concentric and part of an electrode button; and wherein at least one of the electronics components is further adapted to:

impose a voltage between the two source electrodes of the electrode component to impose the first originating electrical signal at the electrode component, measure a current between the two measurement electrodes of the electrode component to measure the first resulting electrical signal at the electrode component, and measure a current at one of the two measurement electrodes of the electrode component to measure the second resulting electrical signal at the electrode component.

16. The system of aspects 10-14, wherein the electrode component includes a source electrode and a measurement electrode; and wherein at least one of the electronics components is further adapted to:

impose a voltage between the source electrode and the measurement electrode of the electrode component to impose the first originating electrical signal at the electrode component, measure a current at the measurement electrode to measure the first resulting electrical signal at the electrode component; and measure a current at the measurement electrode to measure the second resulting electrical signal at the electrode component.

17. The system of aspects 10-16, wherein at least one of the processor units is further adapted to apply a data inversion process for reducing an error between the first measurement and the first modeled tool response and for reducing an error between the second measurement and the second modeled tool response.

18. The system of aspects 10-17, wherein the downhole tool is a logging-while-drilling tool, a measurement-while-drilling tool, or a combination thereof.

19. The system of aspects 10-18, wherein at least one of the processor units is at a surface above the geological formation.

20. A method for determining a standoff between a surface of a downhole tool to a wall of a borehole, the method comprising:

disposing the downhole tool into the borehole, the downhole tool including an electrode component exposed from the surface of the downhole tool, and one or more electronics components disposed within the downhole tool;

imposing, using at least one of the electronics components, a first originating electrical signal at the electrode component when the distance between the borehole wall and a surface of the downhole tool is expected to be no more than a first distance, measuring, using at least one of the electronics components, a first resulting electrical signal at the electrode component to obtain a first measurement, the first resulting electrical signal generated as a result of the first originating electrical signal, and fitting, using one or more processor units, the first measurement to a first modeled tool response to determine the standoff.

21. A method for determining a standoff between a surface of a downhole tool to a wall of a borehole, the method comprising:

disposing the downhole tool into the borehole, the downhole tool including an electrode component exposed from the surface of the downhole tool, one or more transformers exposed from the surface of the downhole tool, and one or more electronics components;

imposing, using at least one of the electronics components, a second originating electrical signal at one of the transformers when the distance between the borehole wall and a surface of the downhole tool is expected to be no less than a second distance, measuring, using at least one of the electronics components, a second resulting electrical signal at the electrode component to obtain a second measurement, the second resulting electrical signal generated as a result of the second originating electrical signal, and fitting, using one or more processor units, the second measurement to a second modeled tool response to determine the standoff.

The disclosure may be embodied in other forms without departing from the spirit or characteristics thereof. The embodiments disclosed in this disclosure are to be considered in all respects as illustrative and not limitative. The scope of the disclosure is indicated by the appended claims rather than by the foregoing description; and all changes which come within the meaning and range of equivalency of the claims are intended to be embraced therein.

The invention claimed is:

1. A method for determining a standoff between a surface of a downhole tool and a surface of a geological formation, the method comprising:

providing the downhole tool that includes an electrode component exposed from a surface of the downhole tool, one or more transformers exposed from the surface of the downhole tool, and one or more electronics components;

when the standoff between the surface of the geological formation and the surface of the downhole tool is expected to be no more than a first distance:

imposing, using at least one of the electronics components, a first originating electrical signal at the electrode component, measuring, using at least one of the electronics components, a first resulting electrical signal at the electrode component to obtain a first measurement, the first resulting electrical signal generated as a result of the first originating electrical signal, and fitting, using one or more processor units, the first measurement to a first modeled tool response to determine a first standoff between the surface of the downhole tool and the surface of the geological formation; and/or when the standoff between the surface of the geological formation and the surface of the downhole tool is expected to be no less than a second distance:

imposing, using at least one of the electronics components, a second originating electrical signal at a first transformer, measuring, using at least one of the electronics components, a second resulting electrical signal at the electrode component to obtain a second measurement, the second resulting electrical signal generated as a result of the second originating electrical signal, and fitting, using one or more processor units, the second measurement to a second modeled tool response to determine a second standoff between the surface of the downhole tool and the surface of the geological formation.

2. The method of claim 1, wherein the first distance is no more than six times the spacing distance between two electrodes of the electrode component and the second distance is no less than two times the spacing distance between the two electrodes of the electrode component.

3. The method of claim 1, further comprising, when the standoff is expected to be no more than the first distance and no less than the second distance, determining an amount of uncertainty in the first standoff and an amount of uncertainty in the second standoff, and selecting between the first standoff and the second standoff based upon the amount of uncertainty determined in the first standoff and the amount of uncertainty determined in the second standoff.

4. The method of claim 1, further comprising:

imposing, using at least one of the electronics components, a third originating electrical signal at the electrode component when the standoff between the surface of the geological formation and the surface of the downhole tool is expected to be no less than the second distance;

measuring, using at least one of the electronics components, a third resulting electrical signal at the electrode component to obtain a third measurement that is sensitive to a resistivity of a drilling fluid disposed between the downhole tool and the surface of the geological formation, the third resulting electrical signal generated as a result of the third originating electrical signal; and fitting, using at least one of the processor units, the third measurement to the first modeled tool response to determine the first standoff between the surface of the downhole tool and the surface of the geological formation and/or fitting, using at least one of the processor units, the third measurement to the second modeled tool response to determine the second standoff between the surface of the downhole tool and the surface of the geological formation.

5. The method of claim 1, further comprising:

imposing, using at least one of the electronics components, a fourth originating electrical signal at a second transformer;

measuring, using at least one of the electronics components, a fourth resulting electrical signal at the electrode component to obtain a fourth measurement that is sensitive to a resistivity of the formation, the fourth resulting electrical signal generated as a result of the fourth originating electrical signal; and fitting, using at least one of the processor units, the fourth measurement to the first modeled tool response to determine the first standoff between the surface of the downhole tool and the surface of the geological formation and/or fitting, using at least one of the processor units, the fourth measurement to the second modeled tool response to determine the second standoff between the surface of the downhole tool and the surface of the geological formation.

6. The method of claim 1, wherein fitting, using at least one of the processor units, the first measurement to the first modeled tool response and fitting, using at least one of the processor units, the second measurement to the second modeled tool response respectively comprise applying a data inversion process adapted to reduce an error between the first measurement and the first modeled tool response and to reduce an error between the second measurement and the second modeled tool response.

7. The method of claim 1, wherein imposing, using at least one of the electronics components, the first originating electrical signal at the electrode component includes:

imposing a voltage between two source electrodes of the electrode component;

wherein measuring, using at least one of the electronics components, the first resulting electrical signal at the electrode component includes:

measuring a current between two measurement electrodes of the electrode component; and wherein measuring, using the at least one electronics component, the second resulting electrical signal at the electrode component includes:

measuring a current using at least one of the two measurement electrodes of the electrode component.

8. The method of claim 1, wherein imposing, using least one of the electronics components, the first originating electrical signal at the electrode component includes:

imposing a voltage between a source electrode and a measurement electrode of the electrode component;

wherein measuring, using at least one of the electronics components, the first resulting electrical signal at the electrode component includes:

measuring a current at the measurement electrode; and wherein measuring, using at least one of the electronics components, the second resulting electrical signal at the electrode component includes:

measuring a current at the measurement electrode.

9. The method of claim 1, wherein the downhole tool is a logging-while-drilling tool, a measurement-while-drilling tool, or a combination thereof.

10. A system for determining a standoff between a surface of a downhole tool and a surface of a geological formation, the system comprising:

the downhole tool including:

an electrode component exposed from the surface of the downhole tool;
one or more transformers exposed from the surface of the downhole tool; and
one or more electronics components adapted to:
when the distance between the surface of the geological formation and the surface of the downhole tool is expected to be no more than a first distance:
impose a first originating electrical signal at the electrode component, and
measure a first resulting electrical signal at the electrode component to obtain a first measurement, the first resulting electrical signal generated as a result of the first originating electrical signal, and/or when the distance between the surface of the geological formation and the surface of the downhole tool is expected to be no less than a second distance:
impose a second originating electrical signal at at least one of the transformers, and
measure a second resulting electrical signal at the electrode component to obtain a second measurement, the second resulting electrical signal generated as a result of the second originating electrical signal;
one or more processor units adapted to:
fit the first measurement to a first modeled tool response to determine a first standoff between the surface of the downhole tool and the surface of the geological formation, and/or
fit the second measurement to a second modeled tool response to determine a second standoff between the surface of the downhole tool and the surface of the geological formation.

11. The system of claim 10, wherein the first distance is six times the spacing distance between two electrodes of the electrode component and the second distance is two times the spacing distance between the two electrodes of the electrode component.

12. The system of claim 10, wherein at least one of the processor units is adapted to, when the standoff is expected to be no more than the first distance and no less than the second distance,
determine an amount of uncertainty in the first standoff and an amount of uncertainty in the second standoff, and
select between the first standoff and the second standoff based upon the amount of uncertainty determined in the first standoff and the amount of uncertainty determined in the second standoff.

13. The system of claim 10, wherein at least one of the electronics components is further adapted to:
impose a third originating electrical signal at the electrode component when the distance between the surface of the geological formation and the surface of the downhole tool is expected to be no less than two times the spacing distance between two electrodes of the electrode component, and
measure a third resulting electrical signal at the electrode component to obtain a third measurement that is sensitive to a resistivity of a drilling fluid disposed between the downhole tool and the geological formation, the third resulting electrical signal generated as a result of the third originating electrical signal; and wherein at least one of the processor units is further adapted to fit the third measurement to the first modeled tool response to determine the first standoff and/or fit the third measurement to the second modeled tool response to determine the second standoff.

14. The system of claim 10, wherein at least one of the electronics components is further adapted to:
impose a fourth originating electrical signal at a second transformer, and
measure a fourth resulting electrical signal at the electrode component to obtain a fourth measurement that is sensitive to a resistivity of the formation, the fourth resulting electrical signal generated as a result of the fourth originating electrical signal; and
wherein at least one of the processor units is further adapted to fit the third measurement to the first modeled tool response to determine the first standoff and/or fit the third measurement to the second modeled tool response to determine the second standoff.

15. The system of claim 10, wherein the electrode component includes two source electrodes and two measurement electrodes, the two measurement electrodes being concentric and part of an electrode button; and
wherein at least one of the electronics components is further adapted to:
impose a voltage between the two source electrodes of the electrode component to
impose the first originating electrical signal at the electrode component,
measure a current between the two measurement electrodes of the electrode component to measure the first resulting electrical signal at the electrode component, and
measure a current at one of the two measurement electrodes of the electrode component to measure the second resulting electrical signal at the electrode component.

16. The system of claim 10, wherein the electrode component includes a source electrode and a measurement electrode; and
wherein at least one of the electronics components is further adapted to:
impose a voltage between the source electrode and the measurement electrode of the electrode component to impose the first originating electrical signal at the electrode component,
measure a current at the measurement electrode to measure the first resulting electrical signal at the electrode component; and
measure a current at the measurement electrode to measure the second resulting electrical signal at the electrode component.

17. The system of claim 10, wherein at least one of the processor units is further adapted to apply a data inversion process for reducing an error between the first measurement and the first modeled tool response and for reducing an error between the second measurement and the second modeled tool response.

18. The system of claim 10, wherein the downhole tool is a logging-while-drilling tool, a measurement-while-drilling tool, or a combination thereof.

19. The system of claim 10, wherein at least one of the processor units is at a surface above the geological formation.

* * * * *